US008442468B2

(12) United States Patent
Reial

(10) Patent No.: US 8,442,468 B2
(45) Date of Patent: May 14, 2013

(54) OMNI-DIRECTIONAL SENSING OF RADIO SPECTRA

(75) Inventor: Andres Reial, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 467 days.

(21) Appl. No.: 12/758,742

(22) Filed: Apr. 12, 2010

(65) Prior Publication Data
US 2011/0250921 A1    Oct. 13, 2011

(51) Int. Cl.
H04B 1/06    (2006.01)
H04B 7/00    (2006.01)

(52) U.S. Cl.
USPC .................. 455/272; 455/276.1; 375/346

(58) Field of Classification Search ........... 455/161.1, 455/269, 272, 276.1, 313, 517; 375/136, 375/147, 148, 346, 349
See application file for complete search history.

(56) References Cited

U.S. PATENT DOCUMENTS

| 5,465,271 | A | 11/1995 | Hladik et al. |
| 5,585,803 | A | 12/1996 | Miura et al. |
| 5,943,609 | A | 8/1999 | Ericson et al. |
| 6,243,415 | B1 | 6/2001 | Pipon et al. |
| 6,570,910 | B1* | 5/2003 | Bottomley et al. ........... 375/148 |
| 6,784,836 | B2 | 8/2004 | Kasperkovitz et al. |
| 6,917,337 | B2 | 7/2005 | Iida et al. |
| 7,072,290 | B2* | 7/2006 | De et al. .................... 370/342 |
| 7,154,934 | B2 | 12/2006 | Hershey et al. |
| 7,260,370 | B2 | 8/2007 | Wang et al. |
| 7,383,019 | B1 | 6/2008 | Thorsted et al. |
| 7,538,740 | B2 | 5/2009 | Korisch et al. |
| 2006/0007890 | A1 | 1/2006 | Yokoyama |
| 2006/0067354 | A1 | 3/2006 | Waltho et al. |
| 2007/0135167 | A1 | 6/2007 | Liu |
| 2007/0224942 | A1 | 9/2007 | Kuramoto et al. |
| 2007/0273584 | A1 | 11/2007 | Kisigami et al. |
| 2008/0107195 | A1 | 5/2008 | Kishigami et al. |
| 2009/0156130 | A1 | 6/2009 | Wang et al. |
| 2009/0232240 | A1 | 9/2009 | Lakkis |

FOREIGN PATENT DOCUMENTS

| EP | 1447920 A1 | 8/2004 |
| EP | 1 729 431 A2 | 12/2006 |
| GB | 2 396 501 A | 6/2004 |
| WO | 2008/136003 A2 | 11/2008 |

OTHER PUBLICATIONS

PCT International Search Report, mailed Jun. 17, 2011, in connection with International Application No. PCT/EP2011/055252.
PCT Written Opinion, mailed Jun. 17, 2011, in connection with International Application No. PCT/EP2011/055252.

(Continued)

Primary Examiner — Quochien B Vuong
(74) Attorney, Agent, or Firm — Potomac Patent Group PLLC

(57) ABSTRACT

Multiple antennas used for data transmission and/or reception are also used to achieve omni-directional antenna functionality. Signals from the antennas are converted to baseband and stored. Phase shifts are applied to the stored signals to steer the effective reception beam in one of a number of directions. A process of interest (e.g., white space sensing) is applied to the beam to produce a result for the given beam direction. By scanning the beam over a number of representative directions, a spatial receiver range equivalent to that of an omni-directional antenna is achieved.

16 Claims, 4 Drawing Sheets

OTHER PUBLICATIONS

Yawgeng A. Chau et al. "Diversity with Distributed Decisions Combining for Direct-Sequence CDMA in a Shadowed Rician-Fading Land-Mobile Satellite Channel" IEEE Transactions on Vehicular Technology, IEEE Service Center, Piscataway, NJ, US, vol. 45, No. 2, May 1, 1996, XP011063483, ISSN: 0018-9545, pp. 237-239.

PCT Second Written Opinion, mailed Apr. 5, 2012, in connection with counterpart Application No. PCT/EP2011/055252.

Cordeiro et al. "IEEE 802.22: An introduction to the First Wireless Standard based on Cognitive Radios", Journal of Communications, vol. 1, No. 1, Apr. 2006.

PCT International Preliminary Report on Patentability, mailed Jul. 2, 2012, in connection with International Application No. PCT/EP2011/055252.

* cited by examiner

OMNI-DIRECTIONAL SENSING OF RADIO SPECTRA

BACKGROUND

The present invention relates to wireless communications, and more particularly to the sensing of wireless transmissions from a user of a spectral resource.

The radio spectrum is a limited resource that should be shared between many different types of equipment such as cellular, home network, broadcast, and military communication equipment. Historically, each part of the radio spectrum has been allocated to a certain use (called a "licensed" and/or "primary" use). This strategy has resulted in all applications/uses being disallowed on the allocated carrier frequency except for those applications included in the license agreement. In practice, this results in large parts of the radio spectrum being unused much of the time. For instance, in the Ultra-High Frequency (UHF) band, where TV broadcasts take place, large geographical areas are unused, mainly due to the large output power needed for such applications; this large output power compels a large reuse distance in order to minimize the risk of interference. An example of such geographical areas within Scandinavia is illustrated in FIG. 1. In FIG. 1, the shaded areas represent geographic locations in which a given carrier frequency is being used by a licensed user (e.g., by Broadcast TV). In the remaining areas, the so-called "white spaces", the given carrier frequency is allocated to the licensed user but is not actually being used by that user.

In order to make better use of the licensed spectral resources, some countries will, in the future, allow unlicensed services (so called "secondary" uses) to take place in areas (called "white spaces") in which the licensed (primary) user is not transmitting. However the primary user will always have priority for the use of the spectrum to the exclusion of others. Therefore, some sort of mechanism needs to be in place to ensure that the unlicensed users are not causing interference to the licensed user.

One mechanism is to install the unlicensed network in a geographical area where at least some parts of the licensed spectra are known to be unused.

However, even more use of the white space can be made if the non-interference mechanism adopts a detection strategy in which it operates on the licensed frequency (or frequencies) in the white space only so long as no licensed user transmissions are detected, and ceases such operation as soon as licensed user transmissions are detected. In this context, ceasing operation may mean ceasing all operation, or alternatively may mean ceasing operation only on those frequencies that are detected as being "in use", and otherwise continuing to operate on other frequencies in the white space. The most straightforward sensor is a signature detector adapted to detect specific signatures transmitted from the licensed/primary user (typically implemented as a matched filer). An example of a white space system currently being standardized is IEEE 802.22. An overview of this system can be found in Cordeiro et al, "IEEE 802.22: An introduction to the First Wireless Standard based on Cognitive Radios", Journal of Communications, Vol 1, No 1, April 2006.

Another consideration regarding the sensing of the licensed user's transmissions is placement of the sensors. When the secondary (e.g., unlicensed) use is for cellular telecommunications, one solution is to include the sensors in the base station of the mobile communication system. Sometimes, the base station's (or network's) own sensors do not provide enough information (e.g., information about the geographical positions of active white space transmitters) for the base stations to have a clear picture of white space spectrum availability as a function of geographical position. Without this information, it is difficult for a base station to use the white space fully. To compensate for this lack of information, it may be necessary to impose quite wide safety margins (for example with respect to frequency and/or power) in order to prevent the unlicensed user's interfering with the primary (licensed) user's use of white space frequencies.

As an alternative to locating the sensors at the base station, dedicated sensors can be distributed throughout the white space. However, this increases the complexity and cost of network implementation within the white space.

An alternative way of achieving a distributed set of sensors throughout the white space is to have sensing performed by each of the mobile terminals that are located within the white space. Each of these mobile terminals performs a sensing operation, and reports its findings to a main node (e.g., the mobile terminal's serving base station), the findings being either in the form of raw data or as some sort of processed data.

The sensing and measurement quality in a white space system needs to be sufficiently good in order to guarantee a lack of interference to the incumbent service. To achieve this, the sensing antenna must be able to detect signal energy arriving from any direction. As described in the Cordeiro et al. publication mentioned above, the white space system specifications require that the sensing antenna operate with an omni-directional pattern.

In practice, this requires a sensing antenna design that is distinct from the antenna(s) used by a mobile terminal for data communication with the base station and implies that an additional antenna unit needs to be included with the terminal. However, it is extremely difficult (and sometimes impossible) to obtain a reliable omni-directional pattern for an antenna embedded in the space-constrained industrial design of a handset, so the sensing antenna may have to be placed outside the unit. Even worse, in order to obtain sufficient sensing sensitivity with the omni-directional pattern (typically 0 dBi gain), the antenna itself may need to be placed outdoors.

The fact that a separate antenna is needed adds cost and design constraints to the terminal. It also complicates the use of existing terminal products in white space networks due to their lack of any antennas with omni-directional properties. Furthermore, placing the sensing antenna outdoors is not feasible in some usage scenarios.

There is therefore a need for an alternative sensing approach that permits mobile terminals to perform white space sensing tasks with high sensitivity without insisting on omni-directional antenna designs.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses in which a user equipment comprising a receiver coupled to a plurality of antennas is operated in a manner comparable to omni-directional antenna functionality. Such operation involves receiving a radiofrequency signal at each one of the antennas. The radiofrequency signal supplied by each of the antennas is converted into a sequence of baseband signal samples to thereby produce a plurality of baseband signal sample sequences, wherein each of the baseband signal sample sequences is associated with a respective one of the antennas. Each of the baseband signal sample sequences is stored. Then, for each one of a plurality of spatial directions having a same point of origin, the following is performed:

retrieving from storage each of the baseband signal sample sequences;

weighting each of the retrieved baseband signal sample sequences by a respective one of a plurality of complex weights and combining the weighted baseband signal sample sequences to produce a combined signal sample sequence representing a received beam pointed in the spatial direction;

processing the combined signal sample sequence to arrive at a result for the spatial direction; and using the result for the spatial direction to control a further action performed by the user equipment.

In some but not necessarily all embodiments, the plurality of spatial directions are equally spaced around the point of origin.

In some but not necessarily all embodiments, the result for the spatial direction indicates whether a signal from a transmitter has been detected. In some of such embodiments, using the result for the spatial direction to control a further action performed by the user equipment comprises reporting the result for the spatial direction to a serving base station with which the user equipment is in communication. In some alternative ones of such embodiments, this reporting is performed in response to the result for the spatial direction indicating that the signal from the transmitter has been detected.

In some embodiments in which the result of the spatial direction indicates whether a signal from a transmitter has been detected, using the result for the spatial direction to control a further action performed by the user equipment comprises determining whether the result for the spatial direction indicates that the signal from the transmitter has been detected and combining this determination with determinations derived for other ones of the plurality of spatial directions to produce a combined result that indicates whether the transmitter has been detected in any of the spatial directions. The combined result is then reported to a serving base station with which the user equipment is in communication.

In some embodiments in which the result for the spatial direction indicates whether a signal from a transmitter has been detected, the plurality of spatial directions is determined based, at least in part, on which spatial directions are associated with a past detection of the signal from the transmitter.

In yet another set of alternative embodiments, the plurality of antennas is a subset of a total number of user equipment antennas.

In still another set of alternative embodiments, the weights have non-uniform magnitude values.

BRIEF DESCRIPTION OF THE DRAWINGS

The objects and advantages of the invention will be understood by reading the following detailed description in conjunction with the drawings in which.

DETAILED DESCRIPTION

Figure 1:
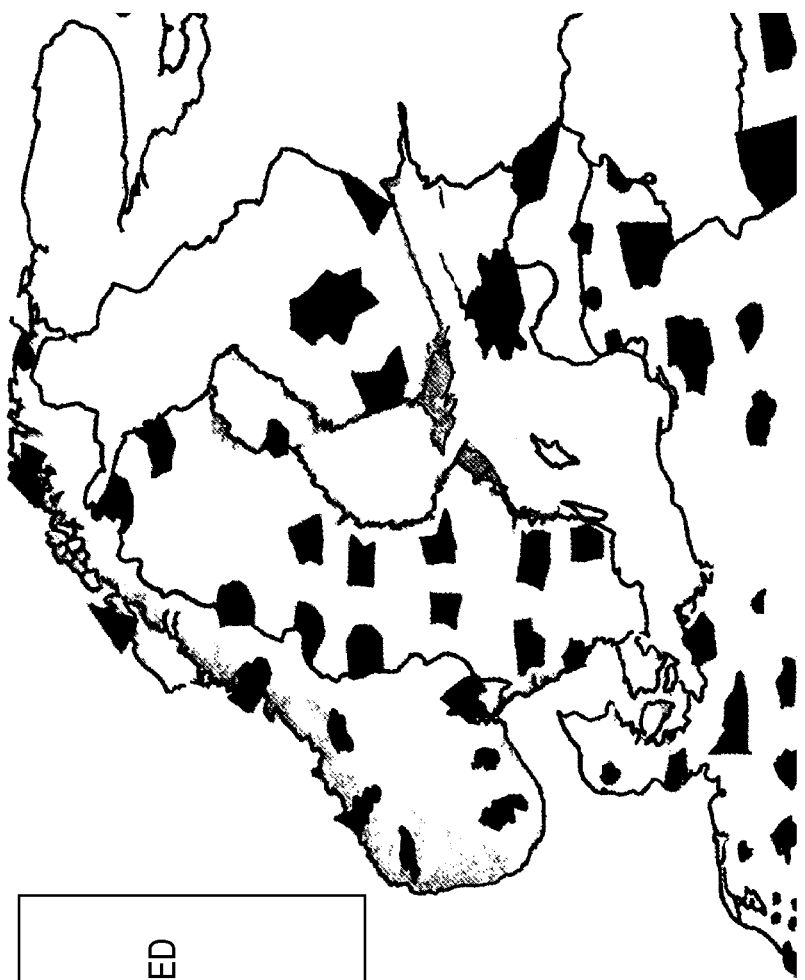
FIG. 1 illustrates geographical areas constituting so-called "white spaces" located in Scandinavia.
Figure 1:
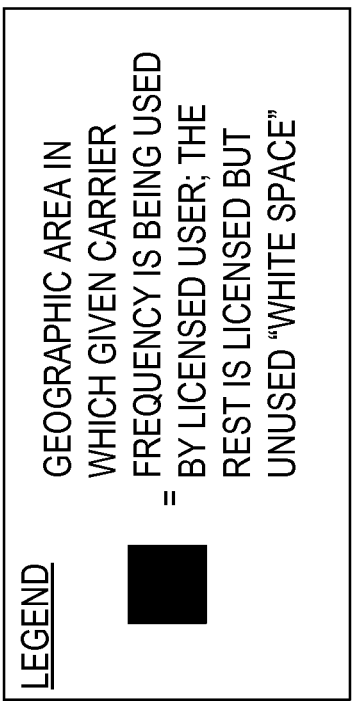

The various features of the invention are described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

Modern mobile terminals typically include two or more antennas to enable the use of Multiple Input Multiple Output (MIMO) techniques during data reception and/or transmission. In an aspect of embodiments consistent with the invention, these same multiple antennas also used for sensing. By combining the antenna signals with proper weights (wherein each weight comprises a phase shift and in some but not necessarily all embodiments, also a magnitude component), the effective reception beam may be steered in any direction. The received signals are, therefore, recorded. The recorded signals are then analyzed, with lobe directions of interest being created in the baseband. By scanning the beam over a number of representative directions, a spatial sensing range equivalent to that of an omni-directional antenna is achieved.

These and other aspects are now described in further detail in the following.

In order to provide a context for understanding the utility of embodiments consistent with the invention, an application will be presented in which mobile terminals (so-called "User Equipments", or "UEs") are called upon to perform white space sensing due to their unlicensed operation in a white space, as discussed in the Background section above. It will be understood that this is presented merely for the purposes of illustration and is not intended to limit the scope of the invention. To the contrary, those of ordinary skill in the art will recognize that omni-directional antenna functionality can be employed in many different applications having nothing to do with white space sensing.

Figure 2:
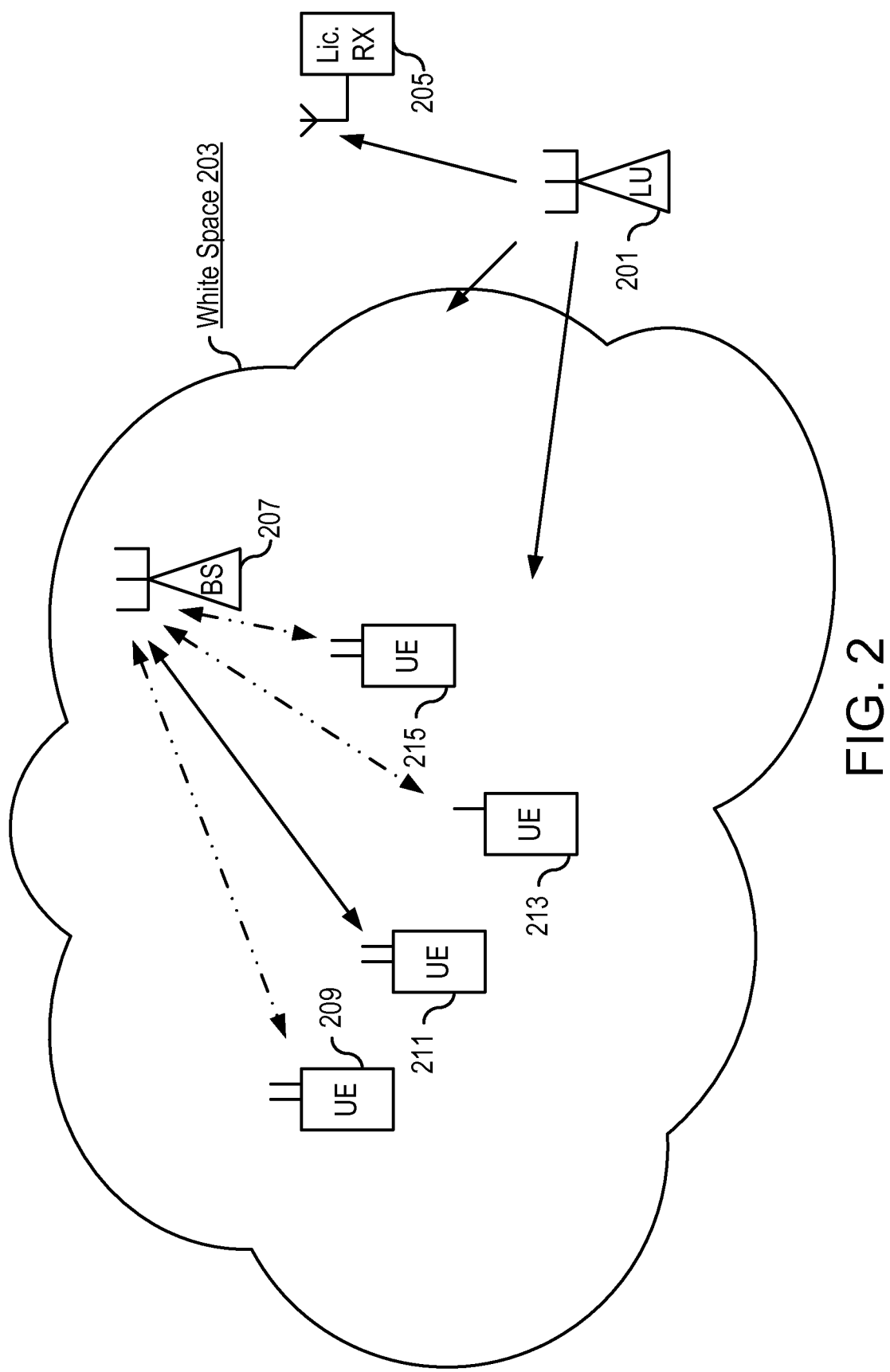
FIG. 2 is a block diagram of an exemplary system in which various aspects of the invention are deployed and utilized.

FIG. 2 is a block diagram of an exemplary system in which UEs are configured to use omni-directional antenna functionality as provided by embodiments consistent with the invention. In this example, the UEs use this capability for the purpose of white space sensing. A licensed user (LU) 201 is depicted operating within a geographic area that includes a white space 203. Transmissions of the licensed user 201 are intended to be received by, for example, one or more licensed receivers, only one of which (the licensed receiver 205) is depicted. A mobile communication system is configured in accordance with various aspects of the invention to permit it to operate as an unlicensed user within the white space 203. The mobile communication system includes a serving base station 207 that serves one or more UEs, including the UEs 209, 211, 213, and 215. In the context of the invention, the base station 205 exemplifies a "main node." In other embodiments different equipment constitutes the "main node." For example, in WLAN systems, a router can operate as a main node in the context of the invention. To facilitate readability of this document, the well-known term "base station" is used herein as a generic term that covers not only base stations in the traditional sense, but also all forms of radio access nodes in all forms of radio access technologies, of which cellular communication equipment and WLAN technology are but two examples.

Each of the UEs 209, 211, 213, and 215 includes circuitry configured in accordance with the inventive principles described herein to have omni-directional receiver antenna reception capability as will now be described with reference to FIG. 3. In this exemplary example, the omni-directional receiver antenna capability makes it advantageous to use the UEs 209, 211, 213, and 215 as white space sensors.

It will be understood that many wireless communications terminals (handsets, laptops, PC cards, etc.—all generically referred to herein as "UEs") incorporate multiple RX antennas to improve fading immunity and to apply spatio-temporal interference suppression and MIMO technologies. A reception beam (lobe) may be formed, using two or more RX antennas, by combining their respective signals after first applying a set of respective phase shifts. Different magnitudes can also be applied to the respective signals if warranted (e.g., if antenna gains differ significantly within the equipment—those of ordinary skill in the art will readily know how to assess if this is the case), but in general the use of different magnitudes is of secondary importance, since the signal and interference power information, traditionally used for such scaling, is not available. The multi-antenna system will exhibit directionality (i.e., reception of signals primarily arriving from a particular direction), with the particular direction itself being a function of the phase shifts that are applied. This directionality appears in the form of a lobe in the composite antenna diagram (as well as a null or attenuation in some other direction(s)). The lobe also results in an effective antenna gain in the spatial direction of the lobe.

Figure 3:
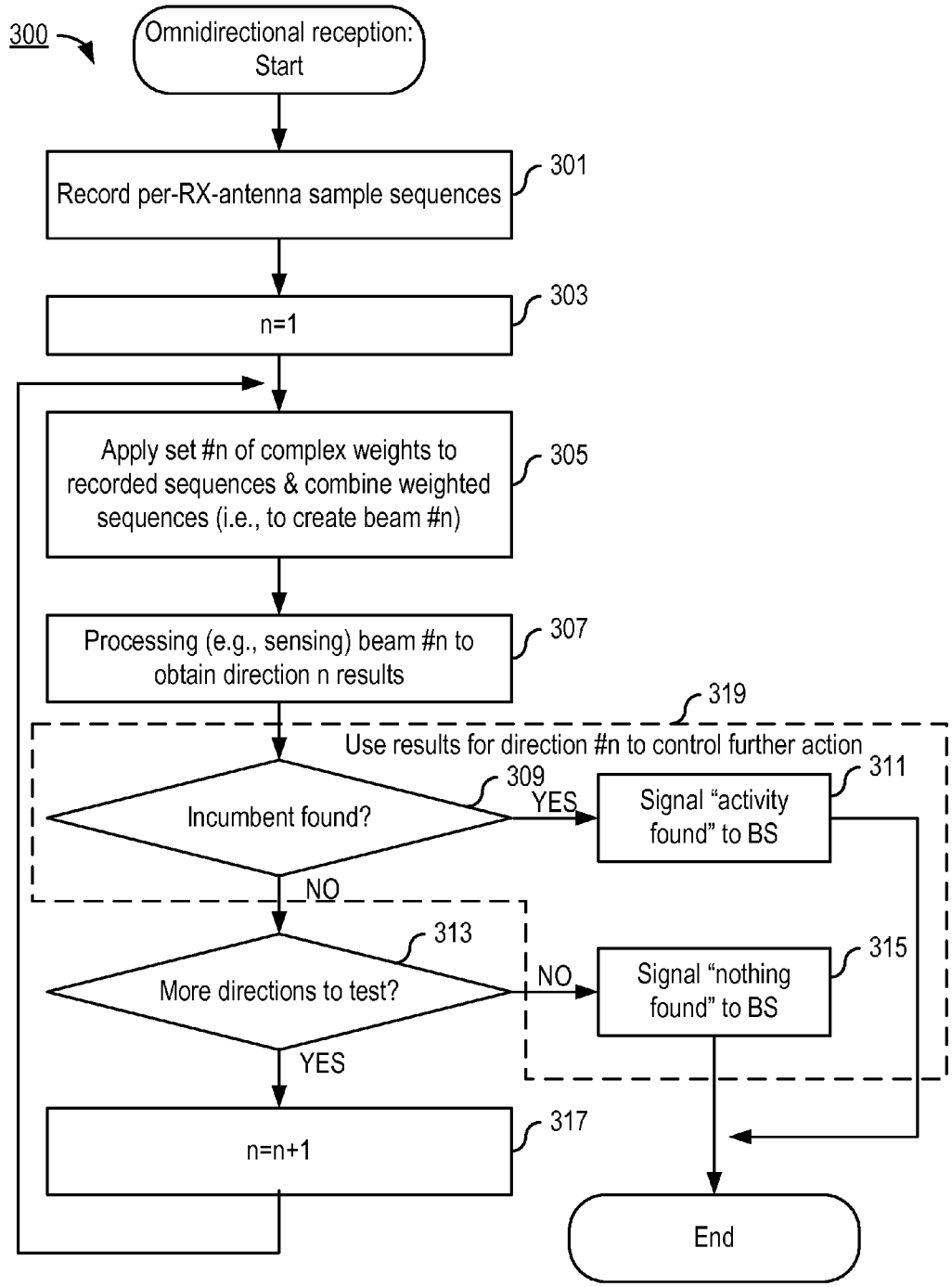
FIG. 3 is, in one respect, a flow chart of steps/processes/functions, carried out by an exemplary UE consistent with the invention to instill in the UE a beamforming capability and further to use this capability to emulate an omni-directional antenna.

FIG. 3 is, in one respect, a flow chart of steps/processes/ functions, carried out by an exemplary UE consistent with the invention to instill in the UE a beamforming capability and further to use this capability to emulate an omni-directional antenna. In another respect, FIG. 3 can be considered to depict the various elements of circuitry 300 configured to carry out the various functions described in FIG. 3 and its supporting text.

In the exemplary embodiment, a local variable, n, is used to indicate one of a plurality of sensing directions. The choice of the number of candidate beam directions is implementation-dependent. One possible choice is to test a total of 8 directions. It is advantageous to make these equally spaced around all 360°, especially when there is no a priori information available regarding potential directions of interest. After a previous scanning round has detected an incumbent signal, the equipment can adopt a strategy of focusing a bit more in that direction, especially if the detected signal energy is close to the decision threshold (i.e., the detected region could be allocated a few additional spatial directions to be tested), but this is not an essential aspect of the invention.

To begin omni-directional reception, signal energy reaching each one of the plurality of antennas is sampled and recorded (step 301). Also, the local variable n is initialized to a value of "1" (step 303). Each antenna's samples are maintained separately in the storage. By performing an analysis on stored signal samples, different spatial directions can be examined sequentially with the results nonetheless indicating what was received at a same moment/window of time. In this way, performance equivalent to omni-directional performance is achieved. It will be appreciated that the "storage" utilized herein can be implemented in any of a number of ways. Some non-limiting examples of such storage include a random addressable memory (RAM), optical means, and electronic buffering/delay devices.

Continuing with the process depicted in FIG. 3, a set of complex weights (one for each antenna whose signal is being processed) corresponding to direction #n are applied to the stored sample sequences from the respective antennas, and the weighted (and therefore at least non-uniformly phase-shifted) samples from the different antennas are then combined to achieve a set of samples representing a received signal from a receiver antenna having a receiver lobe in direction #n (step 305). The magnitudes of the complex weights can either be uniform or nonuniform relative to one another. It will be appreciated that one or more phase shift values in the set of weights may be "zero" (i.e., resulting in no actual phase shifting after the weight is applied), but in the context of this disclosure, the resultant weighted value is still considered to be among the set of "weighted" or "phase-shifted" values.

The combined signals are then processed as needed for the application to obtain results for direction #n. In this non-limiting example, this means processing the combined signals in accordance with any of a number of known white space detection algorithms to produce a result indicative of whether an incumbent user's signal has been found coming from direction #n (step 307). This result is tested to determine whether an incumbent user was found (decision block 309). If yes ("YES" path out of decision block 309), then some sort of notification (e.g., "activity found") is signaled to the main node (e.g., base station) (step 311). In some embodiments, the notification could include other information as well (e.g., the direction in which the incumbent was found, the frequency band in which the incumbent was found and/or the detected signal strength), but these aspects of reporting are beyond the scope of the invention and are therefore not described here in further detail. In still other embodiments, the notification may be held in abeyance until all directions have been processed, and the results then combined to indicate whether an incumbent was found in any direction. The notification then indicates this final (combined) result.

If the incumbent was not found in direction #n ("NO" path out of decision block 309), it is ascertained whether there are more directions to be tested (decision block 313). For example, where the total number of directions is known (e.g., 8 as mentioned earlier), the present value of the local variable n can be compared with the number of directions to be tested to determine whether all have yet been tested. If there are no more directions to test ("NO" path out of decision block 313), then some sort of notification (e.g., "nothing found") is signaled to the main node (e.g., base station) (step 315). In alternative embodiments, the sensing system can be designed such that the UE makes no report unless an incumbent user is detected, in which case step 315 is omitted from such embodiments.

Returning to decision block 313, if there are more directions to be tested on the stored signals from the plural antennas ("YES" path out of decision block 313), then the local variable n is incremented (step 317), and processing reverts back to step 305, which proceeds as described above.

As mentioned above, white space sensing is just one of many possible applications to which the omni-directional antenna capability can be put. More generally, decision block/steps 309, 311, and 315 constitute an exemplary example of how an embodiment can use the result for the spatial direction #n to control a further action performed by the user equipment (step 319). Other actions can instead be taken in accordance with what a given application is intended to accomplish. Detailed descriptions of all such actions are beyond the scope of the invention.

The phase shifts referred to above are applied by, for example, multiplying the complex baseband sample sequences by a complex exponential of the form:

$$c_n = e^{j2\pi \frac{n}{N}}, n = 0 \ldots N-1.$$

where $c_n$ is the complex phase shift between adjacent antennas to achieve a reception lobe in direction #n, and where N is the total number of directions to be tested. In practice, different embodiments may have different numbers of plural antennas available. When more than two antennas are available, it can be advantageous to use the two best antennas at a time, since the beam-forming is "blind", which makes it very hard to guarantee constructive accumulation of more than two received signals having random and unknown phases. In some embodiments having more than two antennas available within the equipment, several antenna pairs may be applied to perform several virtual scanning processes, so that the respective "−z-axis" nulls are covered.

The illustrated complex exponential has uniform magnitudes for all antennas. However, as mentioned earlier, it is possible to practice alternative embodiments in which the magnitudes are non-uniform throughout the set of weights, thereby selectively emphasizing/deemphasizing the contributions from different antennas.

As mentioned above, the choice of the number of candidate beam directions is implementation-dependent. For example, when a total of 8 candidate beam directions will be used, and assuming just for the sake of simplicity that there are only two antennas involved, the combined samples for processing direction #n is obtained as:

$$s_k = s_k^{(0)} + c_n s_k^{(1)}$$

where $s_k$ is a k:th combined sample (e.g., as generated in step 305 discussed above) and $s_k^{(0)}$ and $s_k^{(1)}$ represent the recorded k:th samples from respective antennas 0 and 1.

In some alternative embodiments, not all candidate directions are tested at every sensing occasion; instead, only those with previously noticeable signal levels are checked. In some of these alternative embodiments, occasional full searches may be carried out to detect new possible directions of signal arrival.

While the individual RX antennas are far from omni-directional, the scanning operation yields a close-to-uniform coverage of the spatial region of interest. For a size-constrained handset, it is difficult to link the physical lobe directions to particular combining weights (e.g., to be able to identify the physical angle of arrival of the incumbent signal), but this is not necessary for the invention to work. As long as the apparatus scans through all the representative directions, coverage equivalent to an omni-directional antenna is obtained.

Also as mentioned earlier, the technique may be extended to more than two antennas. If antenna subsets with distinctly different alignments are available (e.g., in laptops devices where there may be two subsets of two mutually parallel antennas), each subset may be beam-steered separately to maximize the spatial sensing range. This example will in fact have a better sensing range than a single perfect omni-directional antenna, which still has nulls in the z-axis directions.)

The required sensing beam scanning is achieved entirely in baseband processing, and is performed for all desired directions from the same recorded data. Thus there are no problems with missing a signal from one direction while listening to another, as is the case with, for example, the classical mechanical rotating radar scanner.

Figure 4:
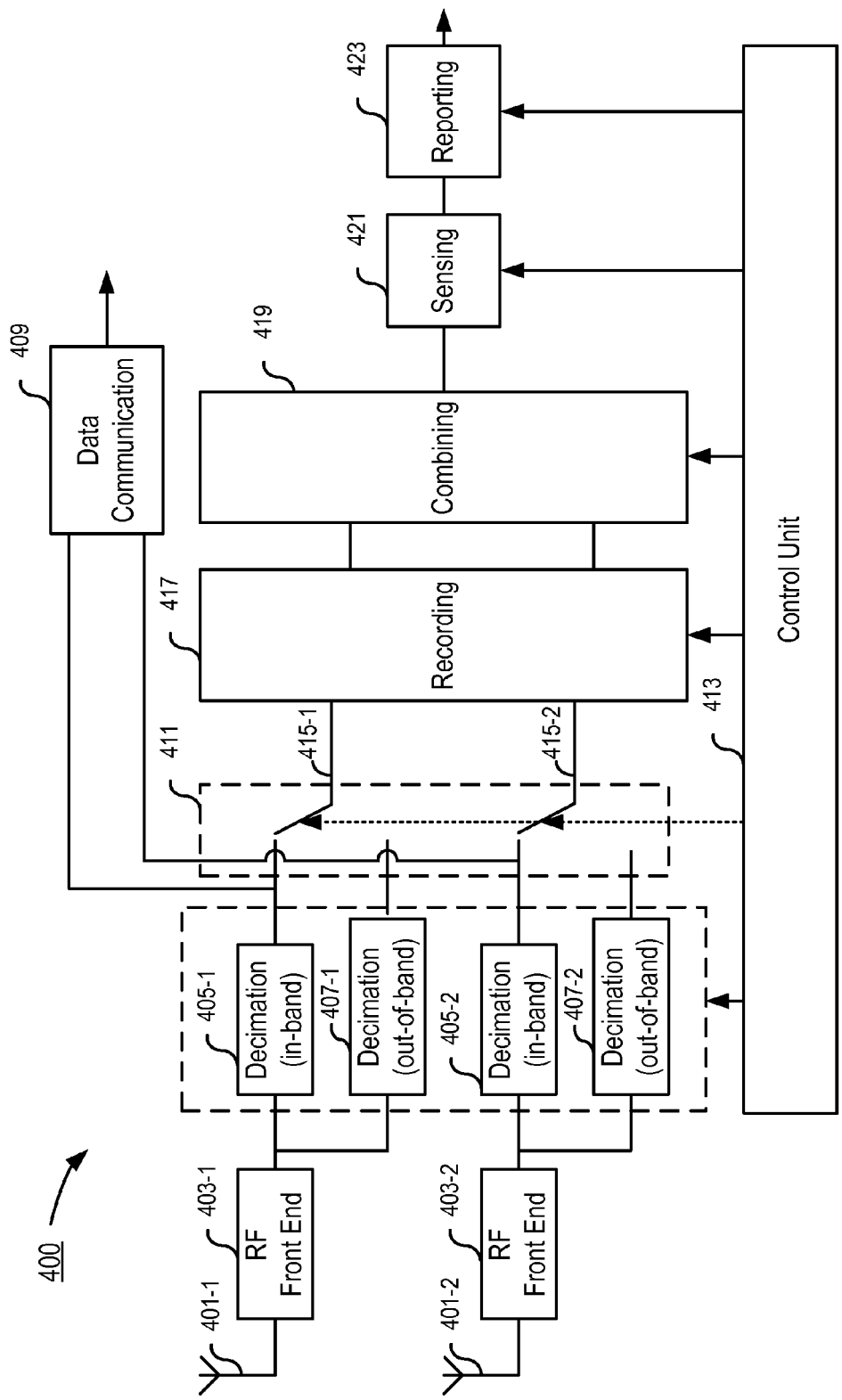
FIG. 4 is a block diagram of a UE adapted with circuitry configured to carry out the various aspects of the invention.

The measurement constraints and data traffic scheduling aspects of mobile communication are not affected by the invention. For in-band measurements, the network traffic is gated. Out-of-band measurements may be performed independently of the network activity in that band. FIG. 4 is a block diagram of an exemplary UE 400 adapted with circuitry configured to carry out various aspects of the invention. For the sake of clarity, only those components having particular relevance to the invention are depicted. Those of ordinary skill in the art will readily understand that the UE 400 also includes other circuitry (not depicted) that is well-known in the art and therefore need not be described herein.

In this example, the UE 504 employs MIMO communication technology, and is equipped with first and second antennas 401-1 and 401-2. As mentioned earlier, the invention can easily be adapted to operate with more than two antennas. The receiver can exploit the spatial dimensions of the signal at the receiver to achieve higher spectral efficiency and higher data rates without increasing bandwidth.

The signals picked up by the first and second antennas 401-1, 401-2 are supplied separately to respective first and second radiofrequency (RF) front end circuitry 403-1, 403-2 that are configured in accordance with any of a number of well-known arrangements to perform radio reception up to but not including the point at which the received signal is converted to a baseband signal. The signal samples generated by the respective first and second RF front end circuitry 403-1, 403-2 are converted to base band signals by means of decimation. For the UE's conventional communication tasks, an in-band decimation rate is used to produce a baseband signal, whereas for out-of-band white space sensing, an out-of-band decimation rate is used. Accordingly, the first RF front end circuitry 403-1 supplies its signal sequence to respective inputs of a first in-band decimation unit 405-1 and to a first out-of-band decimation unit 407-1. Similarly, the second RF front end circuitry 403-2 supplies its signal sequence to respective inputs of a second in-band decimation unit 405-2 and to a second out-of-band decimation unit 407-2.

The respective outputs from the first and second in-band decimation units 405-1, 405-2 are supplied to respective inputs of data communication circuitry 409 which, for the purpose of receiving normal data associated with the mobile communication system, processes the baseband signals in accordance with any of a number of known circuits, the details of which is beyond the scope of the invention.

With respect to the UEs omni-directional antenna functionality (which is an additional function beyond what a mobile communication system would normally require of a UE for operation within the mobile communication system), the UE can be requested to apply this to in-band signals (i.e., within the same frequency band that the UE and its serving base station are using for wireless communication with one another) or out-of-band signals (i.e., sensing outside the frequency band that the UE and its serving base station are using for wireless communication with one another). To enable selection between these two signal types, a ganged switch arrangement 411 is provided that receives the outputs from each of the first and second in-band decimation units 405-1, 405-2 and from the out-of-band decimation units 407-1, 407-2 and, for each antenna separately, enables selection between in-band and out-of-band baseband signals associated with the respective first and second antennas 401-1, 401-2. (In the exemplary embodiment, the ganged switch arrangement 411 comprises a plurality of switches that are commonly controlled so that they all make the same switch selection at any given time, and each provides its output at a respective one of a plurality of output ports.) A control unit 413 controls, among other things, the ganged switch arrangement 411 so that when the UE 400 is performing data reception in connection with its participation in the mobile communication system the switches connect to the first and second in-band decimation units 405-1, 405-2 and provide these decimated signals at respective first and second switch outputs ports 415-1, 415-2. This switch position can also be used when the UE 400 requires in-band omni-directional antenna capability, such as for in-band white-space sensing. However, when the UE 400 needs to utilize its omni-directional antenna functionality for out-of-band signals, the control unit 413 causes the ganged switch arrangement 411 to connect to the first and second out-of-band decimation units 407-1, 407-2 and provide these decimated signals at the respective first and second switch outputs ports 415-1, 415-2.

It will be appreciated that, in order to facilitate an understanding of various aspects, the illustrated embodiment shows an implementation of the ganged switch arrangement made from distinct, physical switches. However it will be appreciated that, in alternative embodiments, the ganged switch arrangement may also be conceptual; that is the same physical circuitry may be used (i.e., shared) for in- and out-of band decimation and other processing (e.g. on a time-division basis). In such embodiments, the ganged switch concept corresponds to configuring the different parts of the circuitry with appropriate sampling and conversion parameters. The first and second switch output ports 415-1, 415-2 feed their signals to respective inputs of recording circuitry 417 which stores these respective signals. The recording circuitry 417 has a corresponding number of output ports as the number of its input ports, and each one of the output ports provides recorded baseband signals that are associated with a respective one of the antennas 401-1, 401-2. These signals are supplied to combining circuitry 419 which applies the corresponding phase shifts for each antenna and combines the phase-shifted signals as discussed above. The combining circuitry thereby forms a receiver beam, and the output port of the combining circuitry 419 supplies a synthesized receiver baseband signal exhibiting directional properties as discussed above.

In this exemplary embodiment, a white space sensing operation is illustrated. Therefore, the combined signal from the combining circuitry 419 is supplied to sensing circuitry 421 which analyzes the combined signal to ascertain whether a particular signal is present. This analysis can be performed in accordance with any of a number of known techniques, the details of which are beyond the scope of the invention. The results of this analysis are supplied to reporting circuitry 423, which can report a suitable indication to a main node regarding, for example, whether an incumbent user was found.

The control unit 413 operates the various circuitry so that the recorded signals are retrieved multiple times (i.e., once for each direction to be investigated) with different phase shifts being applied at each time to obtain a different direction. By testing desired directions selected between 0 and 360 degrees, the control unit can cause the received (and recorded) signal to be analyzed/processed with essentially the same results as if that signal had been received from a physical omni-directional antenna. In some embodiments, the control unit 413 causes the receive circuitry to carry out the steps/processes depicted in FIG. 3.

The various aspects of embodiments consistent with the invention provide a number of advantages. For example, it solves at least two problems: First, the need for a separate omni-directional antenna is eliminated. This simplifies the industrial design of a terminal, among other things. Second, the sensitivity requirement of the sensing antenna is lowered, because the beam-forming operation provides some directionality gain. It may therefore be possible to avoid having to place the antenna outdoors.

The invention has been described with reference to particular embodiments. However, it will be readily apparent to those skilled in the art that it is possible to embody the invention in specific forms other than those of the embodiment described above.

For example, the exemplary embodiment illustrated in FIG. 4 is equipped with both in-band and out-of-band decimators to permit both types of sampling to be performed. However, it may be known at the time of manufacture that a given piece of equipment will never be called upon to perform out-of-band sampling. In such embodiments, cost and complexity can therefore be reduced by eliminating the out-of-band decimation units as well as other circuitry that supports the co-existence of different types of decimation units within one equipment, such as the ganged switch arrangement 411.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a user equipment comprising a receiver coupled to a plurality of antennas, the method comprising:

receiving a radiofrequency signal at each one of the antennas;

converting the radiofrequency signal supplied by each of the antennas into a sequence of baseband signal samples to thereby produce a plurality of baseband signal sample sequences, wherein each of the baseband signal sample sequences is associated with a respective one of the antennas;

storing each of the baseband signal sample sequences; and performing the following for each one of a plurality of spatial directions having a same point of origin:

retrieving from storage each of the baseband signal sample sequences;

weighting each of the retrieved baseband signal sample sequences by a respective one of a plurality of complex weights, and combining the weighted baseband signal sample sequences to produce a combined signal sample sequence representing a received beam pointed in the spatial direction;

processing the combined signal sample sequence to arrive at a result for the spatial direction; and using the result for the spatial direction to control a further action performed by the user equipment, wherein the result for the spatial direction indicates whether a signal from a transmitter has been detected.

2. The method of claim 1, wherein the plurality of spatial directions are equally spaced around the point of origin.

3. The method of claim 1, wherein using the result for the spatial direction to control a further action performed by the user equipment comprises reporting the result for the spatial direction to a serving base station with which the user equipment is in communication.

4. The method of claim 1, wherein using the result for the spatial direction to control a further action performed by the user equipment comprises reporting the result for the spatial direction to a serving base station with which the user equipment is in communication in response to the result for the spatial direction indicating that the signal from the transmitter has been detected.

5. The method of claim 1, wherein using the result for the spatial direction to control a further action performed by the user equipment comprises:

determining whether the result for the spatial direction indicates that the signal from the transmitter has been detected and combining this determination with determinations derived for other ones of the plurality of spatial directions to produce a combined result that indicates whether the transmitter has been detected in any of the spatial directions; and reporting the combined result to a serving base station with which the user equipment is in communication.

6. The method of claim 1, comprising:

determining the plurality of spatial directions based, at least in part, on which spatial directions are associated with a past detection of the signal from the transmitter.

7. The method of claim 1, wherein the plurality of antennas is a subset of a total number of user equipment antennas.

8. The method of claim 1, wherein the complex weights have non-uniform magnitude values.

9. An apparatus for operating a user equipment that comprises a receiver coupled to a plurality of antennas, the apparatus comprising:

circuitry configured to receive a radiofrequency signal at each one of the antennas;

circuitry configured to convert the radiofrequency signal supplied by each of the antennas into a sequence of baseband signal samples to thereby produce a plurality of baseband signal sample sequences, wherein each of the baseband signal sample sequences is associated with a respective one of the antennas;

circuitry configured to store each of the baseband signal sample sequences; and circuitry configured to perform the following for each one of a plurality of spatial directions having a same point of origin:

retrieving from storage each of the baseband signal sample sequences;

weighting each of the retrieved baseband signal sample sequences by a respective one of a plurality of complex weights, and combining the weighted baseband signal sample sequences to produce a combined signal sample sequence representing a received beam pointed in the spatial direction;

processing the combined signal sample sequence to arrive at a result for the spatial direction; and using the result for the spatial direction to control a further action performed by the user equipment, wherein the result for the spatial direction indicates whether a signal from a transmitter has been detected.

10. The apparatus of claim 9, wherein the plurality of spatial directions are equally spaced around the point of origin.

11. The apparatus of claim 9, wherein using the result for the spatial direction to control a further action performed by the user equipment comprises reporting the result for the spatial direction to a serving base station with which the user equipment is in communication.

12. The apparatus of claim 9, wherein using the result for the spatial direction to control a further action performed by the user equipment comprises reporting the result for the spatial direction to a serving base station with which the user equipment is in communication in response to the result for the spatial direction indicating that the signal from the transmitter has been detected.

13. The apparatus of claim 9, wherein using the result for the spatial direction to control a further action performed by the user equipment comprises:

determining whether the result for the spatial direction indicates that the signal from the transmitter has been detected and combining this determination with determinations derived for other ones of the plurality of spatial directions to produce a combined result that indicates whether the transmitter has been detected in any of the spatial directions; and reporting the combined result to a serving base station with which the user equipment is in communication.

14. The apparatus of claim 9, comprising:

circuitry configured to determine the plurality of spatial directions based, at least in part, on which spatial directions are associated with a past detection of the signal from the transmitter.

15. The apparatus of claim 9, wherein the plurality of antennas is a subset of a total number of user equipment antennas.

16. The apparatus of claim 9, wherein the complex weights have non-uniform magnitude values.

* * * * *

UNITED STATES PATENT AND TRADEMARK OFFICE
CERTIFICATE OF CORRECTION

| | | |
|---|---|---|
| PATENT NO. | : 8,442,468 B2 | Page 1 of 1 |
| APPLICATION NO. | : 12/758742 | |
| DATED | : May 14, 2013 | |
| INVENTOR(S) | : Reial | |

It is certified that error appears in the above-identified patent and that said Letters Patent is hereby corrected as shown below:

In the Specification

In Column 5, Line 16, delete "base station 205" and insert -- base station 207 --, therefor.

In Column 8, Line 33, delete "UE 504" and insert -- UE 400 --, therefor.

Signed and Sealed this
Eleventh Day of February, 2014

Michelle K. Lee
*Deputy Director of the United States Patent and Trademark Office*